US011149833B2

(12) United States Patent
Maguire et al.

(10) Patent No.: US 11,149,833 B2
(45) Date of Patent: Oct. 19, 2021

(54) ELECTRIC DRIVE MODULE WITH INDEPENDENT DRIVE UNITS HAVING FRICTION BRAKES THAT ARE SELECTIVELY ENGAGEABLE TO ONE ANOTHER (71) Applicant: BorgWarner Inc., Auburn Hills, MI (US)

(72) Inventors: Joel Maguire, Hartland, MI (US); Paul Diemer, Clarkston, MI (US); Hakan Yilmaz, Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/015,767

(22) Filed: Sep. 9, 2020

(65) Prior Publication Data
US 2021/0079992 A1 Mar. 18, 2021

Related U.S. Application Data (60) Provisional application No. 62/900,048, filed on Sep. 13, 2019.

(51) Int. Cl.
*F16H 48/22* (2006.01)
*B60W 10/08* (2006.01)
(Continued)

(52) U.S. Cl.
CPC ............ *F16H 48/22* (2013.01); *B60K 17/20* (2013.01); *B60W 10/02* (2013.01); *B60W 10/08* (2013.01); *B60K 2001/001* (2013.01)

(58) Field of Classification Search
CPC ... F16H 48/22; B60K 17/20; B60K 2001/001; B60W 10/02; B60W 10/08
See application file for complete search history.

(56) References Cited

U.S. PATENT DOCUMENTS 4,458,794 A * 7/1984 Yater ................. F16D 67/04
192/18 A
4,463,841 A * 8/1984 Kelley ............... F16D 67/04
192/18 A
(Continued)

FOREIGN PATENT DOCUMENTS

DE 19648979 A1 * 5/1998 ........... B60K 7/0007

OTHER PUBLICATIONS

Machine translation of DE 19648979 filed Aug. 7, 2021 (Year: 2021).*

*Primary Examiner* — Tisha D Lewis
(74) *Attorney, Agent, or Firm* — Burris Law, PLLC (57) ABSTRACT An electric drive module that includes a housing, a pair of drive units and a coupling unit. The drive units are disposed in the housing and each drive unit includes a motor unit and a friction brake. The motor unit has a stator, which is non-rotatably coupled to the housing, and a rotor that is rotatable about a motor axis and configured to drive a wheel of a vehicle. The friction brake has a first portion, which is non-rotatably coupled to the housing, and a second portion that is drivingly coupled to the rotor. The friction brake can be operated to create a rotational drag force that resists rotation of the second portion relative to the first portion. The coupling unit is configured to selectively rotatably couple the second portions of the friction brakes to one another.

18 Claims, 4 Drawing Sheets (51) Int. Cl.
  *B60K 17/16* (2006.01)
  *B60W 10/02* (2006.01)
  *B60K 1/00* (2006.01)

(56) References Cited

U.S. PATENT DOCUMENTS

| | | |
|---|---|---|
| 4,607,736 A | 8/1986 | Kelley |
| 7,458,433 B2 | 12/2008 | Harrup et al. |
| 10,059,323 B2 * | 8/2018 | Ando .................... B60W 10/08 |

* cited by examiner

ELECTRIC DRIVE MODULE WITH INDEPENDENT DRIVE UNITS HAVING FRICTION BRAKES THAT ARE SELECTIVELY ENGAGEABLE TO ONE ANOTHER

CROSS-REFERENCE TO RELATED APPLICATIONS

This application claims the benefit of U.S. Provisional Application No. 62/900,048 filed Sep. 13, 2019, the disclosure of which is incorporated by reference as if fully set forth in detail herein.

FIELD

The present disclosure relates to an electric drive module with independent drive units that each have a friction brake. The friction brakes of the drive units are selectively engageable to one another.

BACKGROUND

This section provides background information related to the present disclosure which is not necessarily prior art.

It is increasingly common for vehicle manufacturers to equip one or more "axles" of a vehicle with an electric drive module having a pair of electric motors that drive respective vehicle wheels. These vehicles can be operated in a propulsion mode to provide propulsion over a limited range, and/or to provide supplemental power at desired times, such as the launching of the vehicle. These vehicles can also be operated in a regenerative mode in which the electric motors are driven by the vehicle wheels to generate electrical energy that can be employed to recharge the battery that provides electrical power to the electric motors. In instances where the vehicle battery is charged to a point where regenerative braking is not appropriate either due to the state of charge of the battery or the rate at which electrical energy would be generated, another means of braking is needed, such as conventional disk brakes, and as such, it can be necessary to coordinate control of a vehicle braking system with other vehicle systems, such as a brake controller.

While the known electric drive modules are suited for their intended purpose, it would nevertheless be desirable to provide an electric drive module having advanced braking and/or traction capabilities.

SUMMARY

This section provides a general summary of the disclosure, and is not a comprehensive disclosure of its full scope or all of its features.

In one form, the present disclosure provides an electric drive module that includes a housing, a pair of drive units and a coupling unit. The drive units are disposed in the housing and each drive unit includes a motor unit and a friction brake. The motor unit has a stator, which is non-rotatably coupled to the housing, and a rotor that is rotatable about a motor axis and configured to drive a wheel of a vehicle. The friction brake has a first portion, which is non-rotatably coupled to the housing, and a second portion that is drivingly coupled to the rotor. The friction brake can be operated to create a rotational drag force that resists rotation of the second portion relative to the first portion. The coupling unit is configured to selectively rotatably couple the second portions of the friction brakes to one another.

In another form, the present disclosure provides an electric drive module that includes a housing, a pair of drive units and a coupling unit. The drive units are disposed in the housing and each drive unit includes a motor unit. The motor unit has a stator, which is non-rotatably coupled to the housing, and a rotor that is rotatable about a motor axis and configured to drive a wheel of a vehicle. The coupling unit is configured to selectively rotatably couple the rotors of the drive units to one another.

In still another form, the present disclosure provides a method that includes: providing a vehicle with an electric drive unit and a pair of vehicle wheels, the electric drive unit having a housing, a pair of drive units and a coupling unit, each of the drive units being disposed in the housing and including a motor unit and a friction brake, the motor unit comprising a stator, which is non-rotatably coupled to the housing, and a rotor, the friction brake having a first portion, which is non-rotatably coupled to the housing, and a second portion that is drivingly coupled to the rotor, the coupling unit being configured to selectively rotatably couple the second portions of the friction brakes to one another, each of the pair of vehicle wheels being drivingly coupled to the rotor of the motor unit of an associated one of the drive units; operating the electric drive unit in a propulsion mode in which the motor units drive the pair of vehicle wheels and the coupling unit does not rotatably couple the second portions of the friction brakes to one another; operating the electric drive unit in a regenerative braking mode in which the motor units of the electric drive units generate electric power and the coupling unit does not rotatably couple the second portions of the friction brakes to one another; operating the electric drive unit in a friction braking mode in which each of the friction brakes is operated to create a rotational drag force that resists relative rotation between the first and second portions of each of the friction brakes and the coupling unit does not rotatably couple the second portions of the friction brakes to one another; and operating the electric drive module in at least one auxiliary mode, the at least one auxiliary mode being selected from a group of modes consisting of: a) an alternative friction braking mode in which each of the friction brakes is operated to create the rotational drag force that resists relative rotation between the first and second portions of each of the friction brakes, and the coupling unit rotatably couples the second portions of the friction brakes to one another; and b) a locked propulsion mode in which the motor units drive the pair of vehicle wheels and the coupling unit rotatably couples the second portions of the friction brakes to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
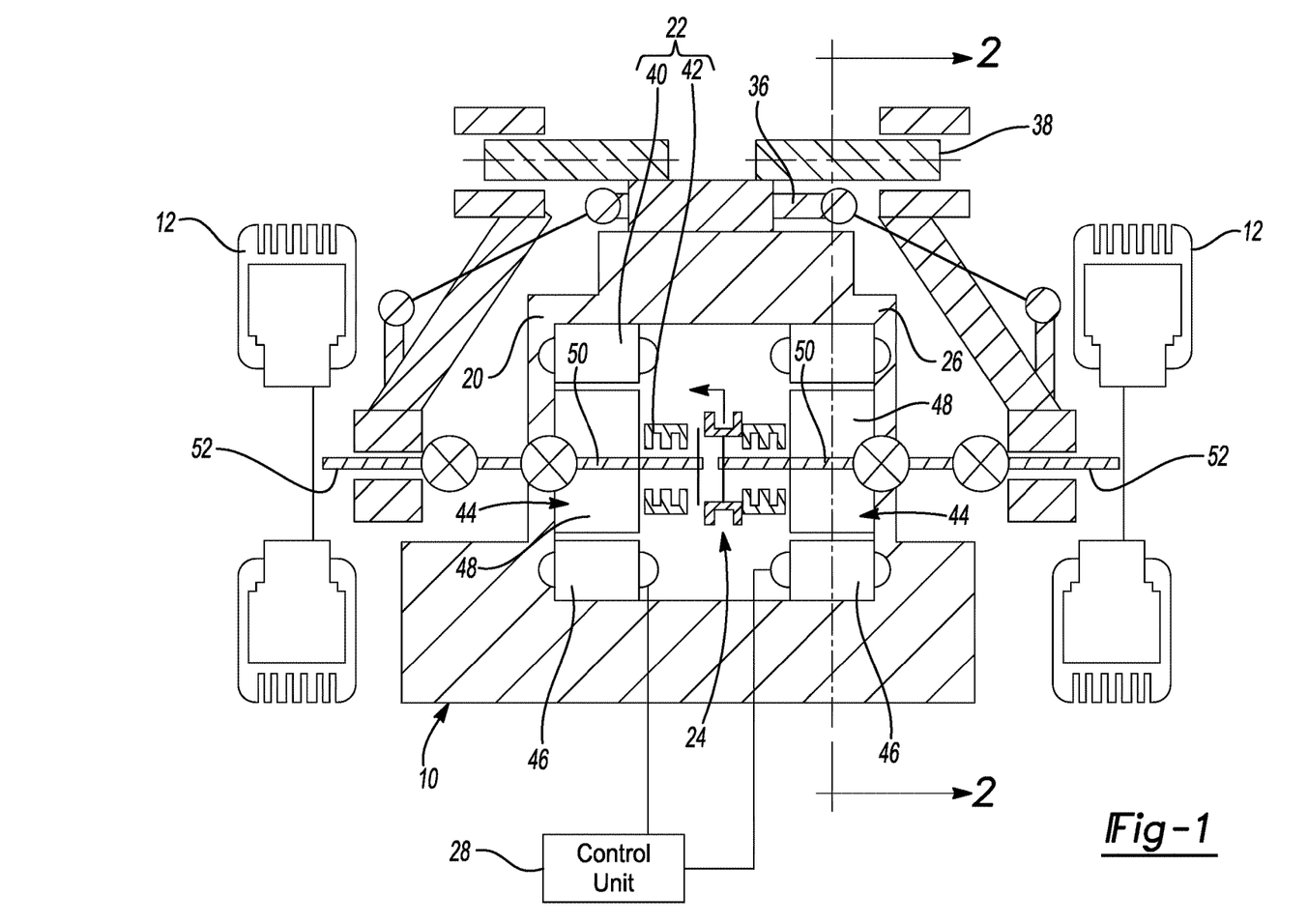
FIG. 1 is a schematic illustration of an exemplary electric drive module constructed in accordance with the teachings of the present disclosure.

With reference to FIG. 1 of the drawings, an exemplary electric drive module constructed in accordance with the teachings of the present disclosure is generally indicated by reference numeral 10. The electric drive module 10 is depicted in the particular example provided as being integrated into a front axle of a vehicle and is employed to drive a pair of steerable drive wheels 12. It will be appreciated, however, that the teachings of the present disclosure have application to other drive axles, and may be employed in vehicles as the source of propulsive power, or in vehicles that have one or more other sources of propulsive power. Where the vehicle has one or more other sources of propulsive power, an electric drive module constructed in accordance with the teachings of the present disclosure could be employed to provide propulsive power simultaneously with one or more of the other sources of propulsive power, and/or could be employed to provide propulsive rotary power while the one or more other sources of propulsive power are idle or inoperative.

Figure 2:
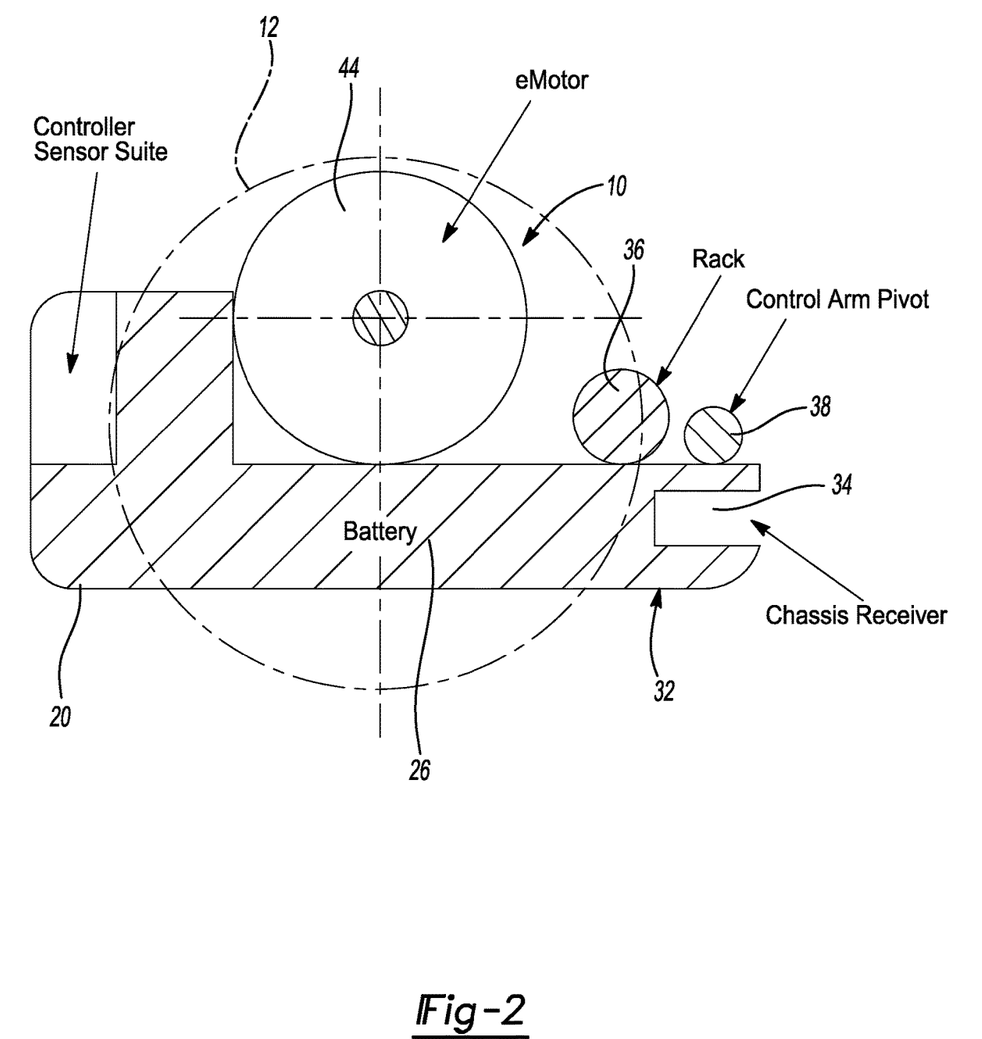
FIG. 2 is a section view taken along the line 2-2 of FIG. 1.

With reference to FIGS. 1 and 2, the electric drive module 10 can include a housing 20, a pair of drive units 22, a coupling unit 24, a battery 26 and a control unit 28. The housing 20 defines a cavity in which the drive units 22, the coupling unit 24, the battery 26 and the control unit 28 are disposed. A portion of the housing 20 can be contoured to matingly engage a portion of a vehicle chassis (not shown). In the example provided, the housing 20 defines a channel-shaped chassis receiver 32 having a laterally extending slot 34 into which a portion of the vehicle chassis is received. The housing 20 can be contoured to fit into the vehicle chassis without interfering with other vehicle components that are employed to connect the vehicle chassis to the steerable drive wheels 12, such as a steering rack 36 and a control arm pivot 38.

Each of the drive units 22 can comprise a motor unit 40 and an optional friction brake 42. The motor unit 40 includes an electric motor 44 having a stator 46, which is fixedly coupled to the housing 20, a rotor 48, which is disposed within the stator 46 and is rotatable relative to the stator 46, and a motor output shaft 50 that is coupled to the rotor 48 for rotation therewith. The electric motor 44 can be any suitable type of electric motor, such as a permanent magnet motor or an induction motor. In the example shown, a proximal end of a half shaft assembly 52 is drivingly coupled to the motor output shaft 50, while a distal end of the half shaft assembly 52 is drivingly coupled to a hub that is rotatably coupled to an associated one of the steerable drive wheels 12. The half shaft assembly 52 can include a pair of universal joints (e.g., homokinetic joints, constant velocity joints) that permit power to be transmitted between the motor output shaft 20 and the proximal end of the half shaft assembly 52, and between the distal end of the half shaft assembly 52 and the hub of the associated one of the steerable drive wheels 12 at a variable angle. As will be appreciated, the universal joints permit power to be transmitted between the electric motor 44 and the associated one of the steerable drive wheels 12 over a range of movement (both vertically and pivotally) of the associated one of the steerable drive wheels 12 relative to the electric motor 44. Optionally, the motor unit 40 can comprise a transmission (not shown) that can have a transmission input member (not shown) that is coupled to the motor output shaft 50 for rotation therewith, and a transmission output member (not shown).

Figure 3:
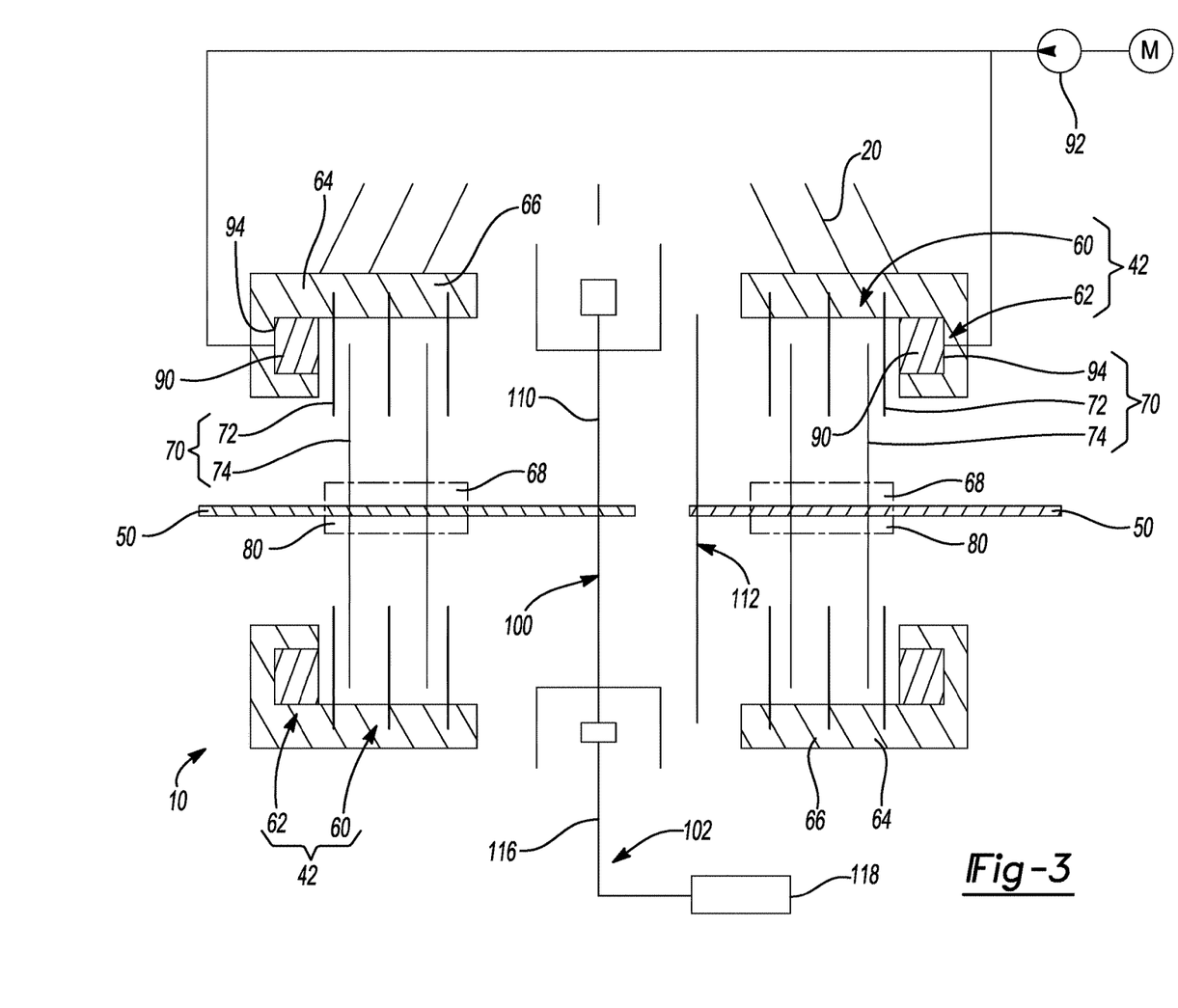
FIG. 3 is an enlarged portion of FIG. 1 illustrating the construction of a coupling unit and portions of a pair of drive units.

With reference to FIGS. 1 and 3, the friction brake 42 is configured to selectively generate rotational drag that will resist rotation of the rotor 48 relative to the housing 20. The friction brake 42 can be any means for selectively providing rotational drag. In the example provided, however, the friction brake 42 includes a friction clutch 60 and a friction clutch actuator 62. The friction clutch 60 can be any type of friction clutch, but in the example provided is a wet friction clutch having a clutch housing 64, a first clutch member 66, a second clutch member 68, and a clutch pack 70 having a set of first clutch plates 72 and a set of second clutch plates 74 that are interleaved with the first clutch plates 72. The clutch housing 64 is fixedly coupled to the housing 20 and defines a cavity into which the first and second clutch members 66 and 68, the clutch pack 70, and the clutch actuator 62 are received. The first clutch member 66 can be fixedly coupled to the clutch housing 64 and can be configured to support the first clutch plates 72. In the example provided, the first clutch member 66 is integrally and unitarily formed with the clutch housing 64, but it will be appreciated that the first clutch member 66 can be a discrete component that can be assembled to the clutch housing 64. The first clutch plates 72 are axially slidably but non-rotatably coupled to the first clutch member 66. In the example provided, the first clutch plates 72 define a plurality of external spline teeth (not specifically shown) and are matingly received into a female splined aperture (not specifically shown) that is defined by the first clutch member 66. The second clutch member 68 is rotatably received in the clutch housing 64 and can be configured to support the second clutch plates 74. In the example provided, the second clutch member 68 comprises a clutch hub 80 and a shaft member that is fixedly coupled to the clutch hub 80 and integrally formed with the motor output shaft 50. It will be appreciated, however, that the shaft member and the motor output shaft 50 could be discrete components that are rotatably coupled to one another through an appropriate coupling or connection. The clutch hub 80 can define a plurality of male spline teeth (not specifically shown) that are spaced circumferentially about the clutch hub 80. The shaft member extends through both axial ends of the clutch housing 64. A first end of the shaft member is coupled to the motor output shaft 50 for rotation therewith. Seals (not specifically shown) can be sealingly engaged to the clutch housing 64 and the shaft member. The second clutch plates 74 are axially slidably but non-rotatably coupled to the second clutch member 68. In the example provided, the second clutch plates 74 define an internally splined aperture (not specifically shown) that is matingly engaged to the male spline teeth formed on the clutch hub 80. A lubricating oil is received in the clutch housing 64 and serves to lubricate and cool the clutch pack 70 during the operation of the electric drive module 10.

With specific reference to FIG. 3, the friction clutch actuator 62 in the particular example provided is a hydraulic actuator having an annular piston 90 and a pump 92. The piston 90 is received in a piston chamber 94 formed in the clutch housing 64 and can translate along the rotational axis of the shaft member 82 between a first position and a second position. Placement of the piston 90 in the first position permits the first and second clutch plates 72 and 74 to rotate relative to one another so that no or relatively little frictional drag is produced by the friction clutch 60. Placement of the piston 90 in the second position inhibits relative rotation between the first and second clutch plates 72 and 74 so that a relatively large frictional drag is produced by the friction clutch 60. The pump 92 supplies hydraulic fluid to the piston chamber 94 to drive the piston 90 toward the second position. The pump 92 can be a reversible pump that can be operated in reverse to draw fluid from the piston chamber 94 to correspondingly cause the piston 90 to move toward the first position. Alternatively, a spring (not shown) can be employed to bias the piston 90 toward the first position. The pump 92 cam be driven by an electric motor 44.

The coupling unit 24 comprises a coupling 100 and a coupling actuator 102. The coupling 100 is configured to selectively rotationally couple the shaft members 82 of the friction clutch units 42 to one another for common rotation. In this regard, the coupling 100 is operable in a first mode, in which the shaft members 82 of the friction clutch units 42 are rotationally decoupled from one another, and a second mode in which the shaft members 82 of the friction clutch units 42 are rotationally coupled to one another. The coupling actuator 102 is configured to selectively change the operational mode of the coupling 100 from the first mode to the second mode, and optionally from the second mode to the first mode.

The coupling 100 can be any type of coupling or clutch, such as an externally splined shaft and an internally splined sleeve (e.g., synchronizer) or a dog clutch. In the example provided, the coupling 100 is a dog clutch having a first dog member 110, which is non-rotatably but axially slidably coupled to a first one of the shaft members 82, and a second dog member 112 that is fixedly coupled to the other one of the shaft members 82. The first and second dog members 110 and 112 have face teeth (not specifically shown). The first dog member 110 is movable along the rotary axis of its associated shaft member 82 between a disengaged position, in which the face teeth of the first dog member 110 are axially spaced apart from the face teeth of the second dog member 112, and an engaged position in which the face teeth of the first dog member 110 are engaged to the face teeth of the second dog member 112. It will be appreciated that positioning of the first dog member 110 in the engaged position inhibits relative rotation between the first and second dog members 110 and 112 and thereby inhibits relative rotation between the shaft members 82 of the friction clutch units 42.

In the example provided, the coupling actuator 102 is configured to move the first dog member 110 between the disengaged and engaged position. In the particular example provided, the coupling actuator 102 comprises a fork 116, which is received in an annular groove that is formed about the first dog member 110, and a linear motor 118 that is employed to translate the fork 116 along an actuation axis that is parallel to the rotational axis of the first dog member 110. The linear motor 118 can be any type of linear motor, such as an electric motor-driven lead screw, a hydraulic piston, and/or a lever, for example, and can include one or more springs that can provide a modicum of compliance to the movement of the first dog member 110 (e.g., when the tooth-on-tooth contact between the first and second dog members 110 and 112 occurs and prevents the first dog member 110 from being translated into its engaged position), and/or to bias the first dog member 110 toward one of the disengaged and engaged positions. In the example provided, the first dog member 110 is biased by a spring toward the disengaged position and as such, the coupling 100 is "normally disengaged". It will be appreciated, however, that a spring could be incorporated into the friction clutch actuator 62 to bias the first dog member 110 toward the engaged position, in which case the coupling 100 would be "normally engaged".

Returning to FIGS. 1 and 2, the battery 26 is conventional in its construction and as such, need not be described in significant detail herein. As noted above, the battery 26 is disposed within the housing 20 of the electric drive module 10 so that the electric drive module 10 may be easily integrated into a vehicle. It will be appreciated, however, that the battery 26 need not be housed in the housing 20 and can be located remotely from various other components of the electric drive module 10.

Figure 4:
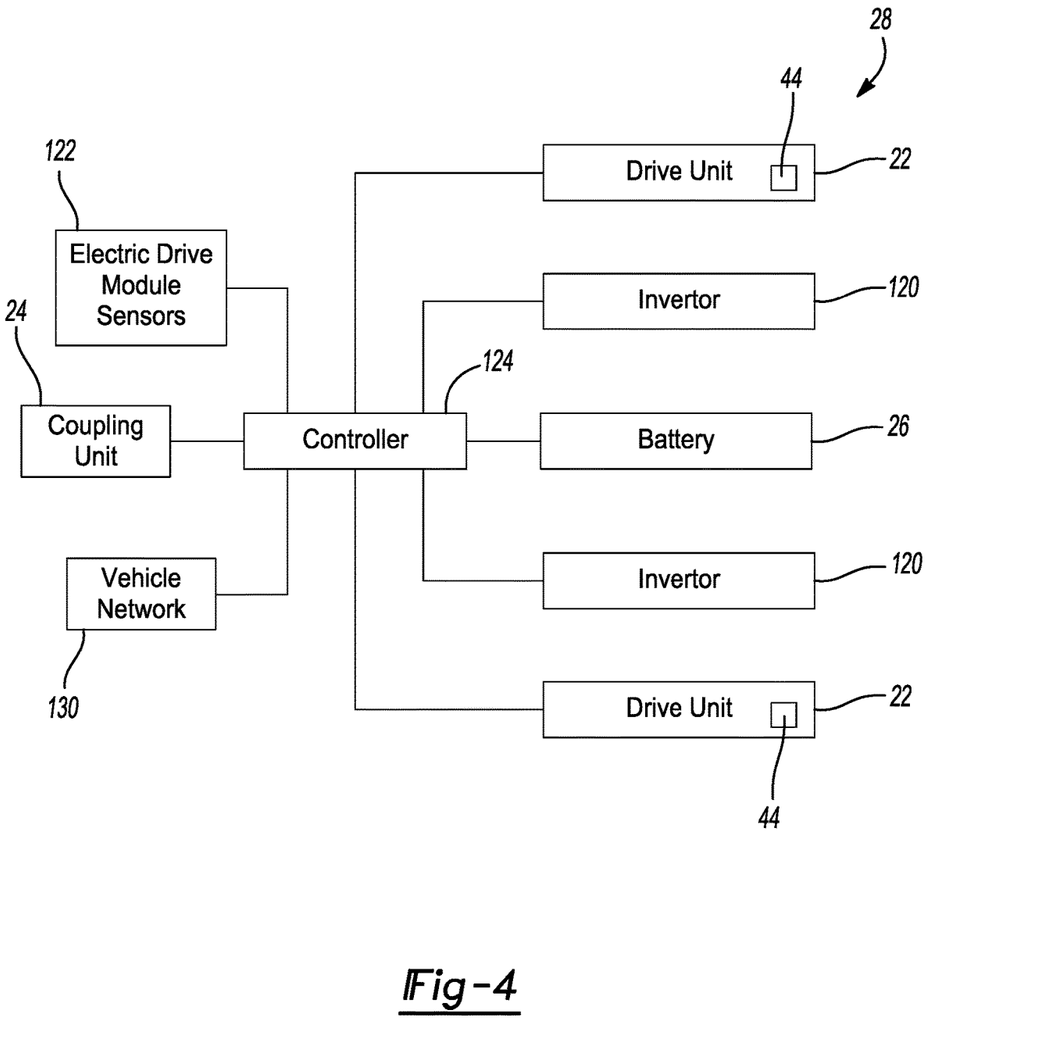
FIG. 4 is a schematic illustration of a portion of the electric drive module of FIG. 1 illustrating a control unit and its integration into the electric drive module.

With reference to FIG. 4, the control unit 28 can comprise a pair of inverters 120, various sensors 122 and a controller 124. Each of the inverters 120 is electrically coupled to the battery 26, a respective one of the electric motors 44 and the controller 124 and is selectively operated by the controller 124 to control the supply of electric power to the respective one of the electric motors 44. The various sensors 122 are employed to sense various parameters of the electric drive module 10 and responsively generate an associated sensor signal. For example, the various sensors 122 can comprise a pair of rotor position sensors that can sense a rotational position of a respective one of the rotors 48 (FIG. 1) relative to its stator 46 (FIG. 1) and responsively generate a rotor position signal that can be employed to control commutation of the associated electric motor 44 as well as to determine the rotational speed of the rotor 48 (FIG. 1). Other sensors may be employed to determine parameters of the electric drive module 10 (FIG. 1) such as the state of charge of the battery 26, the temperature of each of the friction clutches 60 (FIG. 3), the temperature of each of the electric motors 44, the temperature of the battery 26, the current output from various components such as the battery 26 and the inverters 120.

The controller 124 is electrically coupled to the battery 26, the drive units 22, the coupling unit 24, the inverters 120, and the various sensors 122 of the electric drive module 10. Additionally, the controller 124 can be electrically coupled to various controllers (not shown) and sensors (not shown) that are integrated into a vehicle, for example through connection of the controller 124 to a vehicle network 130 (e.g., a CAN bus).

The controller 124 is configured to control the operation of the electric drive module 10 to control the application of propulsive power to the steerable drive wheels 12 of the vehicle, as well as to control braking of the steerable drive wheels 12 and charging of the battery 26.

With reference to FIGS. 1, 3 and 4, the controller 124 can operate the electric drive module 10 in a first mode (i.e., a propulsion mode) in which the electric motors 44 are operated to provide propulsive power to the steerable vehicle wheels 12. In this mode, the controller 124 is configured to drive the shaft members 82 of the electric motors 44 at the same rotational speed. It will be appreciated, however, that the controller 124 can be configured to drive the shaft members 82 of the electric motors 44 at different rotational speeds and/or control the amount of torque that is transmitted to a respective one of the steerable drive wheels 12 to provide a form of traction control for the steerable drive wheels 12. In this mode, the pistons 90 of the clutch actuators 62 are disposed in their first positions and the pump 92 is not operated to thereby maintain the friction clutches 60 in a disengaged condition that minimizes the rotational drag of the friction clutch units 42 on the electric motors 44. Additionally, the coupling actuator 102 is controlled to maintain the first dog member 110 in its disengaged position so that the second clutch members 68 of the friction clutches 60 are rotationally decoupled from one another.

The controller 124 can operate the electric drive module 10 in a second mode (i.e., a regenerative braking mode) in which the electric motors 44 are employed to generate electric power that can be employed to re-charge the battery 26. In this mode, the pistons 90 of the clutch actuators 62 are disposed in their first positions and the pump 92 is not operated to thereby maintain the friction clutches 60 in a disengaged condition that minimizes the rotational drag of the friction clutch units 42 on the electric motors 44. Additionally, the coupling actuator 102 is controlled to maintain the first dog member 110 in its disengaged position so that the second clutch members 68 of the friction clutches 60 are rotationally decoupled from one another. It will be appreciated that the controller 124 can control the inverters 120 to vary the amount of electrical power that is generated in this mode of operation to thereby control the braking force that is created by the generation of electricity as well as to ensure that the current produced in this mode is within a predetermined range and that the battery 26 is not overcharged.

The controller can operate the electric drive module 10 in a third mode (i.e., a friction braking mode) in which the pump 92 is operated to drive the pistons 90 of the clutch actuators 62 to or toward their second first positions to thereby cause the friction clutches 60 to generate rotational drag forces that are employed to brake or slow the rotation of the shaft members 82 of the electric motors 44 (and thereby slow the rotation of the steerable vehicle wheels 12). In this mode of operation, the electric motors 44 not operated to either provide propulsive power or to generate electricity, and the coupling actuator 102 is controlled to maintain the first dog member 110 in its disengaged position so that the second clutch members 68 of the friction clutches 60 are rotationally decoupled from one another. It will be appreciated that the controller 124 can independently control the friction that is produced by each of the friction clutch units 42 to thereby tailor the braking force that is applied to each of the steerable drive wheels 12 to a particular situation (e.g., to provide a form of traction control). Such independent control of the friction clutch units 42 could be accomplished through the use of separate pumps 92 to control the pressure of the hydraulic fluid that is applied to each of the pistons 90, and/or through the use of one or more valves that can be employed by the controller 124 to control the pressure of the hydraulic fluid that is applied to each of the pistons 90.

The electric drive module 10 can be operated in a fourth mode (i.e., a combined braking mode) to slow the rotation of the steerable vehicle wheels 12 by employing the electric motors 44 to generate electric power and operating the pump 92 to drive the pistons 90 of the clutch actuators 62 to or toward their second first positions to thereby cause the friction clutches 60 to generate rotational drag forces. It will be appreciated that this mode of operation may be employed to provide vehicle braking capabilities while limiting the amount of electrical power that is generated and/or to maximize the rotational drag forces that can be applied to each of the steerable vehicle wheels 12. In this mode of operation, the coupling actuator 102 is controlled to maintain the first dog member 110 in its disengaged position so that the second clutch members 68 of the friction clutches 60 are rotationally decoupled from one another.

The electric drive module 10 can be operated in a fifth mode (i.e., an alternative friction braking mode) that is similar to the third mode (i.e., the friction braking mode) except that the coupling actuator 102 is controlled to maintain the first dog member 110 in its engaged position so that the second clutch members 68 of the friction clutches 60 are rotationally coupled to one another.

The electric drive module 10 can be further operated in a sixth mode (i.e., a locked propulsion mode) that is similar to the first mode (i.e., the propulsion mode) except that the coupling actuator 102 is controlled to maintain the first dog member 110 in its engaged position so that the second clutch members 68 of the friction clutches 60 (and therefore the shaft members 82 of the electric motors 44) are rotationally coupled to one another.

It will be appreciated that the controller 124 can be configured to default to a predetermined mode of operation and can control various components of the electric drive module 10 to selectively operate the electric drive module 10 in various different modes in response to various inputs and sensed parameters. For example, the controller 124 can default to the first mode and can switch to another one of the modes of operation in response to various inputs and sensed parameters.

Alternatively, the controller 124 could be configured to default to the fourth mode. In this arrangement, it may be beneficial to configure the coupling unit 24 so that the coupling 100 is "normally engaged". The controller 124 could be configured to switch to the first mode of operation after a diagnostics check performed by the controller 124 verifies that the components and systems of the electric drive module 10 are operating in an expected manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module (10) comprising:
a housing (20);
a pair of drive units (22) disposed in the housing (20), each of the drive units (22) including a motor unit (40) and a friction brake (42), the motor unit (40) comprising a stator (46), which is non-rotatably coupled to the housing (20), and a rotor (48) that is rotatable about a motor axis and adapted to drive a wheel (12) of a vehicle, the friction brake (42) having a first portion (66, 72), which is non-rotatably coupled to the housing (20), and a second portion (68, 74) that is drivingly coupled to the rotor (48), each of the friction brakes (42) being selectively and independently operable to create a rotational drag force that resists rotation of the second portion (68, 74) relative to the first portion (66, 72); and
a coupling (24) that is configured to selectively rotatably couple the second portions (68, 74) of the friction brakes (42) to one another.

2. An electric drive module (10) comprising:
a housing (20);
a pair of drive units (22) disposed in the housing (20), each of the drive units (22) including a motor unit (40) and a friction brake (42), the motor unit (40) comprising a stator (46), which is non-rotatably coupled to the housing (20), and a rotor (48) that is rotatable about a motor axis and adapted to drive a wheel (12) of a vehicle, the friction brake (42) having a first portion (66, 72), which is non-rotatably coupled to the housing (20), and a second portion (68, 74) that is drivingly coupled to the rotor (48), each of the friction brake (42) being selectively operable to create a rotational drag force that resists rotation of the second portion (68, 74) relative to the first portion (66, 72); and
a coupling (24) that is configured to selectively rotatably couple the second portions (68, 74) of the friction brakes (42) to one another;
wherein the coupling (24) comprises (100) a first coupling member (110), which is non-rotatably but axially slidably coupled to the second portion (68, 74) of the friction brake (42) of a first one of the drive units (22), and a second coupling member (112) that is rotatably coupled to the second portion (68, 74) of the friction brake (42) of the other one of the drive units (22).

3. The electric drive module (10) of claim 2, wherein the coupling (100) comprises a dog clutch.

4. The electric drive module (10) of claim 2, wherein the coupling (24) comprises a coupling actuator (102) that is operable for moving the first coupling member (110).

5. The electric drive module (10) of claim 4, wherein the coupling actuator (102) comprises a fork (116) that is axially but non-rotatably coupled to the second coupling member (112).

6. The electric drive module (10) of claim 1, wherein each of the drive units (22) further comprises a half shaft assembly (52) that is drivingly coupled to the rotor (48) of an associated motor unit (40), and wherein the motor unit (40) of each drive unit (22) is disposed between the half shaft assembly (52) and the friction brake (42) of the drive unit (22).

7. The electric drive module (10) of claim 1, wherein each friction brake (42) comprises a friction clutch (60), the friction clutch (60) having a first clutch member (66), a second clutch member (68), a set of first clutch plates (72) and a set of second clutch plates (74), the first clutch member (66) being non-rotatably coupled to the housing (20), the second clutch member (68) being coupled to the rotor (48) for rotation therewith, the first clutch plates (72) being axially slidably but non-rotatably coupled to the first clutch member (66), the second clutch plates (74) being axially slidably but non-rotatably coupled to the second clutch member (68), the second clutch plates (74) being interleaved with the first clutch plates (72), wherein the first portion (66, 72) of the friction brake (42) includes the first clutch member (66) and the first clutch plates (72), and wherein the second portion (68, 74) of the friction brake (42) includes the second clutch member (68) and the second clutch plates (74).

8. The electric drive module (10) of claim 7, wherein the friction clutch (60) of each friction brake (42) is a wet friction clutch having an oil that lubricates the first and second clutch plates (74) of the friction clutch (60).

9. The electric drive module (10) of claim 7, wherein the friction clutch (60) of each friction brake (42) comprises a friction clutch actuator (62) having an annular piston (90).

10. The electric drive module (10) of claim 1, further comprising a battery (26), a pair of inverters (120), and a controller (124), the battery (26) providing a source of electrical energy, each of the inverters (120) being coupled to the battery (26) and to the motor unit (40) of an associated one of the drive units (22), the controller (124) controlling operation of the inverters (124) to drive the motor units (40).

11. The electric drive module (10) of claim 1, wherein the housing (20) defines a laterally extending slot (34) that is configured to receive a portion of a vehicle chassis therein.

12. The electric drive module (10) of claim 1, further comprising a pair of drive wheels (12), each of the drive wheels (12) being driven by the motor unit (40) of a corresponding one of the drive units (22).

13. The electric drive module (10) of claim 12, wherein the pair of drive wheels (12) are steerable wheels.

14. A method comprising:
providing a vehicle with an electric drive module (10) and a pair of vehicle wheels (12), the electric drive module (10) having a housing (20), a pair of drive units (22) and a coupling unit (24), each of the drive units (22) being disposed in the housing (20) and including a motor unit (40) and a friction brake (42), the motor unit (40) comprising a stator (46), which is non-rotatably coupled to the housing (20), and a rotor (48), the friction brake (42) having a first portion (66, 72), which is non-rotatably coupled to the housing (20), and a second portion (68, 74) that is drivingly coupled to the rotor (48), the coupling (24) being configured to selectively rotatably couple the second portions (68, 74) of the friction brakes (42) to one another, each of the pair of vehicle wheels (12) being drivingly coupled to the rotor (48) of the motor unit (40) of an associated one of the drive units (22);
operating the electric drive module (10) in a propulsion mode in which the motor units (40) drive the pair of vehicle wheels (12) and the coupling (24) does not rotatably couple the second portions (68, 74) of the friction brakes (42) to one another;
operating the electric drive module (10) in a regenerative braking mode in which the motor units (40) of the electric drive units (22) generate electric power and the coupling (24) does not rotatably couple the second portions (68, 74) of the friction brakes (42) to one another;
operating the electric drive module (10) in a friction braking mode in which each of the friction brakes (42) is operated to create a rotational drag force that resists relative rotation between the first and second portions (66, 72; 68, 74) of each of the friction brakes (42) and the coupling (24) does not rotatably couple the second portions (68, 74) of the friction brakes (42) to one another; and
operating the electric drive module (10) in at least one auxiliary mode, the at least one auxiliary mode being selected from a group of modes consisting of:
an alternative friction braking mode in which each of the friction brakes (42) is operated to create the rotational drag force that resists relative rotation between the first and second portions (66, 72; 68, 74) of each of the friction brakes (42), and the coupling (24) rotatably couples the second portions (68, 74) of the friction brakes (42) to one another; and
a locked propulsion mode in which the motor units (40) drive the pair of vehicle wheels (12) and the coupling (24) rotatably couples the second portions (68, 74) of the friction brakes (42) to one another.

15. The electric drive module (10) of claim 1, wherein the coupling (24) comprises a coupling (100) having a first coupling member (110), which is non-rotatably but axially slidably coupled to the second portion (68, 74) of the friction brake (42) of a first one of the drive units (22), and a second coupling member (112) that is rotatably coupled to the second portion (68, 74) of the friction brake (42) of the other one of the drive units (22).

16. The electric drive module (10) of claim 15, wherein the coupling (100) comprises a dog clutch.

17. The electric drive module (10) of claim 15, wherein the coupling (24) comprises a coupling actuator (102) that is operable for moving the first coupling member (110).

18. The electric drive module (10) of claim 17, wherein the coupling actuator (102) comprises a fork (116) that is axially but non-rotatably coupled to the second coupling member (112).

* * * * *

UNITED STATES PATENT AND TRADEMARK OFFICE
CERTIFICATE OF CORRECTION

PATENT NO. : 11,149,833 B2
APPLICATION NO. : 17/015767
DATED : October 19, 2021
INVENTOR(S) : Joel Maguire et al.

Page 1 of 1

It is certified that error appears in the above-identified patent and that said Letters Patent is hereby corrected as shown below:

In the Claims

In Column 9, Line 19, after "comprises," delete "(100)" therefor.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*